United States Patent [19]

Fajt et al.

[11] 3,778,584

[45] Dec. 11, 1973

[54] APPARATUS FOR CLAMPING AND ALIGNING PARTS FOR WELDING

[75] Inventors: John Fajt; James V. Neal, Jr., both of Pauls Valley, Okla.

[73] Assignee: El-Tronics, Inc., Cherry Hill, N.J.

[22] Filed: Jan. 10, 1972

[21] Appl. No.: 216,494

[52] U.S. Cl. .................................. 219/101, 219/161
[51] Int. Cl. .............................................. B23k 9/02
[58] Field of Search .................... 219/101, 103, 104, 219/78, 79, 161; 228/45

[56] References Cited
UNITED STATES PATENTS

| | | | |
|---|---|---|---|
| 3,003,052 | 10/1961 | Williams et al. | 219/101 |
| 2,121,665 | 6/1938 | Hudson | 219/101 |
| 2,459,625 | 1/1949 | Copp | 219/101 |
| 2,203,151 | 6/1940 | Tversen | 219/101 |

Primary Examiner—R. F. Staubly
Assistant Examiner—L. A. Schutzman
Attorney—Jerry J. Dunlap et al.

[57] ABSTRACT

An improved welding apparatus for effecting a weld junction between end portions of two parts or conductors wherein the operation cycle of the welding apparatus is automatically initiated when the parts or conductors are in an initial, predetermined start position in a jaw assembly, the jaw assembly being then automatically positioned to securely hold the parts or conductors as the parts or conductors are automatically positioned in a predetermined overlapping, welding position. The welding cycle is automatically initiated subsequent to the parts or conductors being positioned in the welding position to effect the weld junction therebetween, and the joined parts or conductors are then automatically ejected from the welding apparatus, the welding apparatus being then automatically positioned in the start position for receiving subsequent parts or conductors to be joined via a weld junction.

23 Claims, 12 Drawing Figures

PATENTED DEC 11 1973  3,778,584

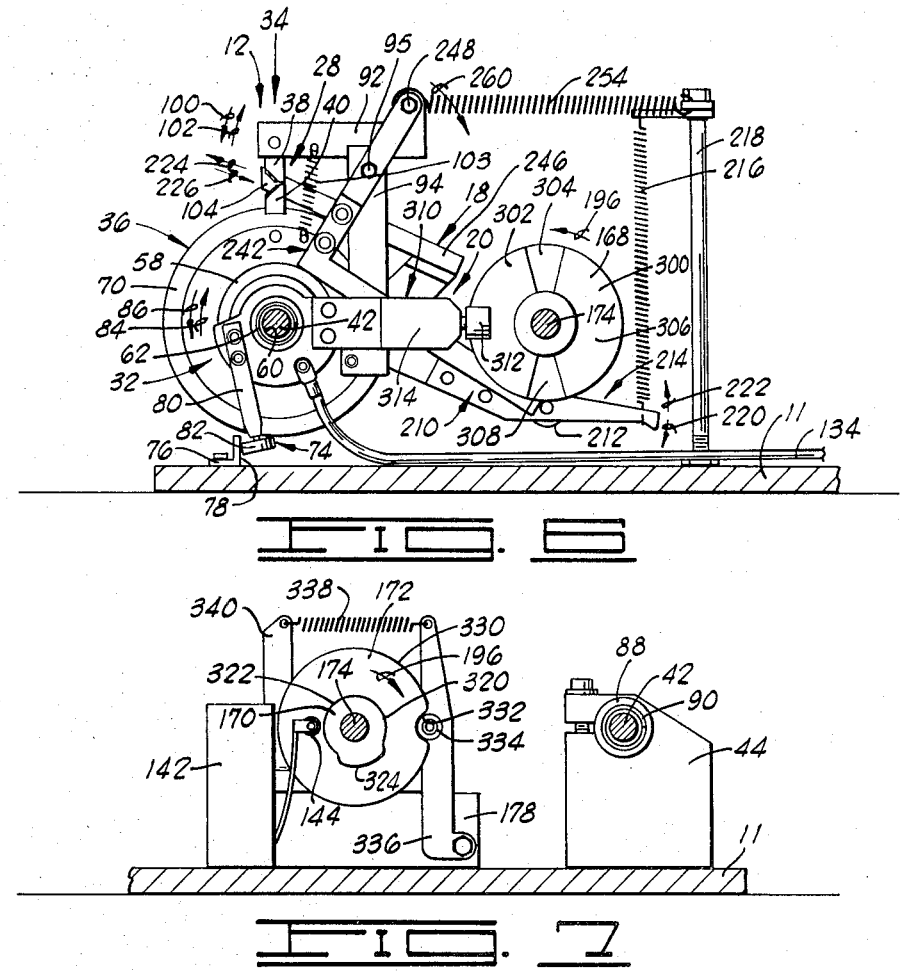
FIG. 6
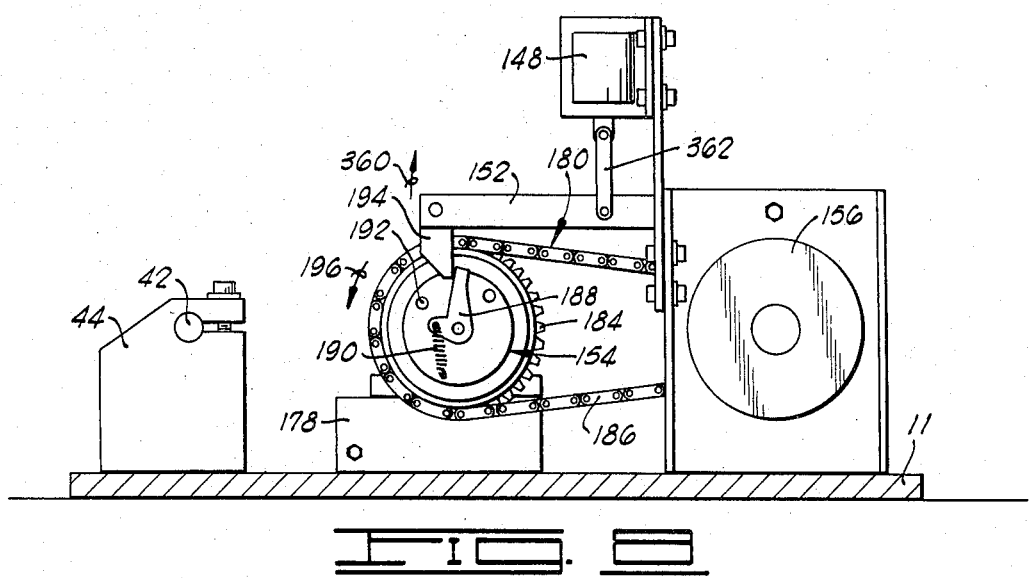
FIG. 7
FIG. 8

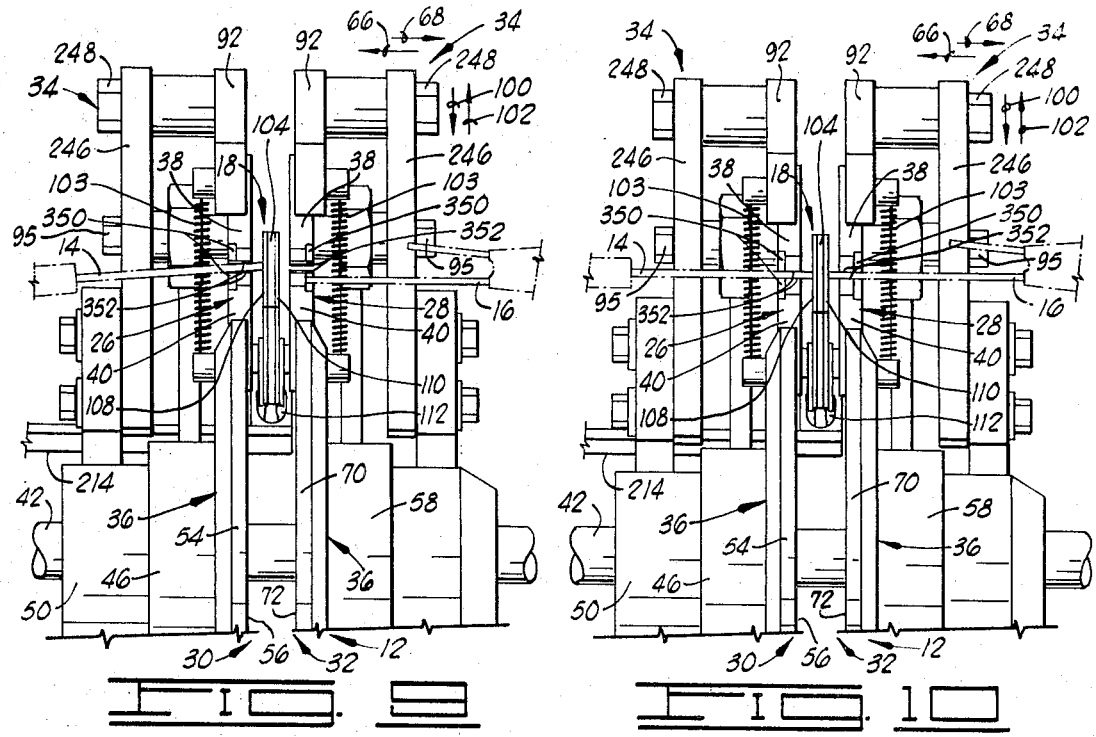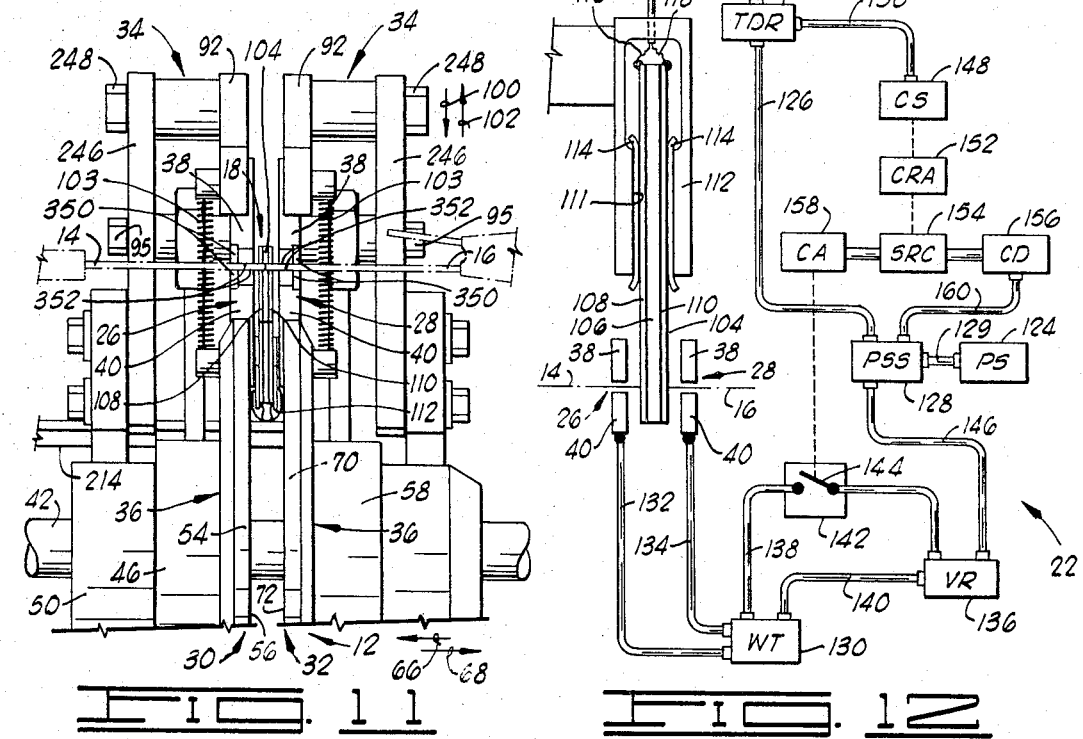

APPARATUS FOR CLAMPING AND ALIGNING PARTS FOR WELDING

BACKGROUND OF THE INVENTION

1. Field of the Invention

This invention relates generally to improvements in welding machines and, more particularly, but not by way of limitation, to an improved welding apparatus for effecting a weld junction between parts or conductors wherein the operation cycle is automatically initiated, the parts or conductors being automatically positioned and joined via a weld junction and the joined parts or conductors being then automatically ejected.

2. Description of the Prior Art

In the past there have been numerous designs proposed to join various parts via a weld junction by supplying a welding current through the parts, the weld junction being formed via a metalurgical fusion of the two parts. Some of the past welding machines have included some type of automatic feed apparatus wherein one or more of the parts to be welded were automatically fed to a particular position on the welding apparatus, the vibratory bowl feeder being typically utilized for such automatic feeding, as well known in the art.

The prior art welding machines have also included various combinations of turrets and jaws operating in cooperation with various forming, cutting and welding stations to produce a variety of parts joined via a weld junction or the like. One such welding apparatus, for example, was constructed to form a bend in a glow switch conductor which was fed from a vibratory bowl type feeder, and then butt weld a capacitor lead to one of the glow switch leads, the capacitor being manually loaded and oriented in the welding apparatus. This last-mentioned welding machine also included a station constructed to test the strength of the weld junction, and a station to eject the joined parts, a welding machine of this type being commercially available from the Federal Tool Engineering Company, for example.

Typical of the welding machines and other related machines and processes are those disclosed in the U.S. Pats.: No. 2,846,561, issued to Pityo; No. 2,784,297, issued to Pityo; No. 2,734,119, issued to Pityo; No. 3,537,276, issued to Pityo; No. 2,578,835, issued to Pityo et al.; No. 2,379,135, issued to Ekstedt et al.; No. 2,848,793, issued to Pityo; No. 3,059,321, issued to Pityo; No. 2,454,338, issued to Pityo et al.; No. 2,449,505, issued to Pityo et al.; No. 2,749,420, issued to Pityo,; No. 2,606,268, issued to Pityo et al.; No. 2,605,537, issued to Pityo et al.; No. 3,005,900, issued to Pityo; No. 2,644,069, issued to Pityo; No. 2,477,894, issued to Pityo et al.; No. 3,258,830, issued to Pityo; and No. 3,479,712, issued to Pityo.

SUMMARY OF THE INVENTION

An object of the invention is to provide an improved apparatus for automatically initiating the operational cycle of the welding apparatus or the like.

One other object of the invention is to provide an improved assembly for initiating the operational cycle of an apparatus for performing work on one or more parts.

Another object of the invention is to provide an improved apparatus for assuring parts are properly positioned in the apparatus prior to the operation cycle being initiated.

Another object of the invention is to provide an improved means facilitating the insertion of parts or conductors in a jaw assembly or the like.

A further object of the invention is to provide a welding apparatus having a faster, more efficient assembly for positioning conductors in a predetermined weld position.

A still further object of the invention is to provide a faster, more efficient and more economical apparatus for aligning jaws of a welding apparatus.

One other object of the invention is to provide an improved welding apparatus having an operation cycle which is automatically controlled in a positive, fast and efficient manner.

Another object of the invention is to provide an improved welding apparatus having an automatically controlled operation cycle, thereby substantially reducing operator error.

Yet another object of the invention is to provide a faster, more efficient and more economical apparatus for effecting a weld junction between conductors at a predetermined, overlapping position of the conductors, in such a manner as to substantially reduce operator error.

Another object of the invention is to provide an improved apparatus for ejecting the welded parts from a welding apparatus.

A further object of the invention is to provide a welding apparatus which is economical in construction and operation.

Other objects and advantages of the invention will be evident from the following detailed description when read in conjunction with the accompanying drawings which illustrate one embodiment of the invention.

BRIEF DESCRIPTION OF THE DRAWINGS

FIG. 6 is an enlarged, sectional view of the welding apparatus of FIG. 1, taken substantially along the lines 6—6 of FIG. 1.

FIG. 7 is an enlarged, sectional view of the welding apparatus of FIG. 1, taken substantially along the lines 7—7 of FIG. 1.

FIG. 8 is an enlarged, sectional view of the welding apparatus of FIG. 1, taken substantially along the lines 8—8 of FIG. 1.

FIG. 9 is an enlarged, fragmentary, front elevational view showing the first jaw assembly and the second jaw assembly in a start position and a first and a second conductor partially disposed therein.

FIG. 10 is a view similar to FIG. 9, but showing the first jaw assembly and the second jaw assembly in an actuated holding position grippingly engaging the first conductor and the second conductor.

FIG. 11 is a view similar to FIG. 9, but showing the first jaw assembly and the second jaw assembly in the welding position securedly positioning the first conductor and the second conductor in a predetermined welding position.

FIG. 12 is a diagrammatical, schematic view of a portion of the control assembly of the welding apparatus of FIG. 1, and showing an enlarged, plan view of the tongue and the clip of the tongue assembly of the welding apparatus of FIG. 1.

DESCRIPTION OF THE PREFERRED EMBODIMENT

Figure 1:
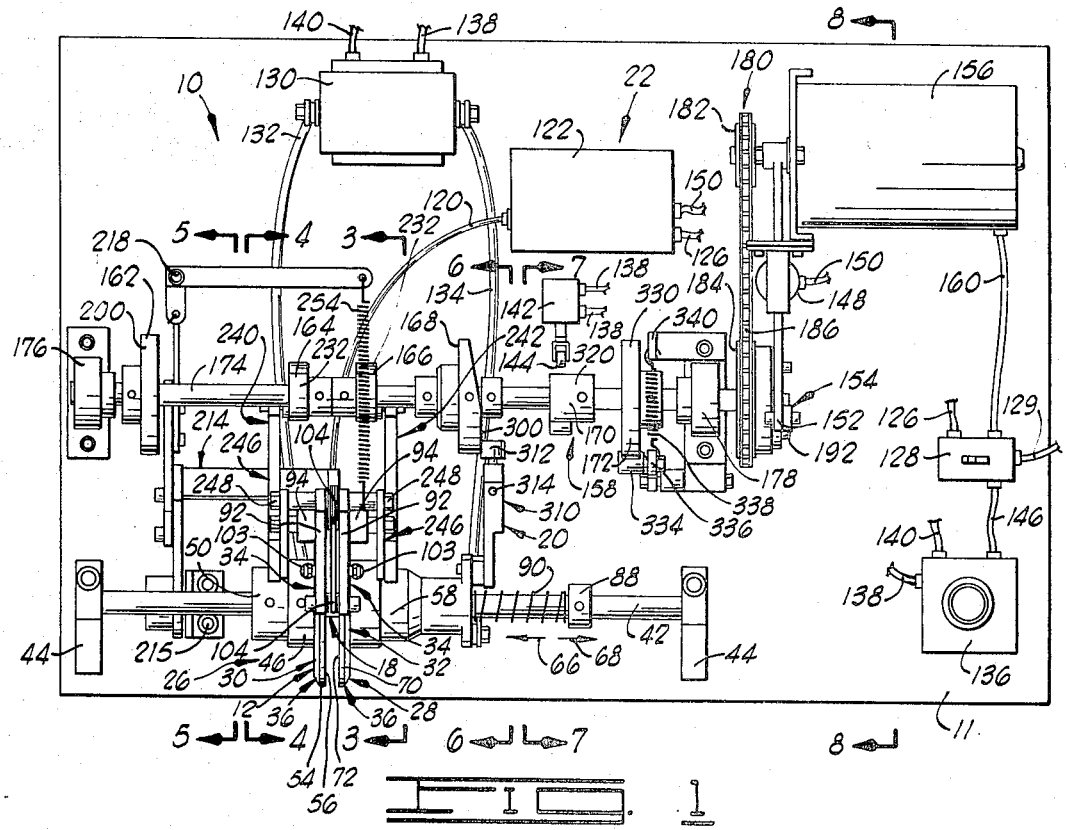
FIG. 1 is a top plan view of the welding apparatus of the present invention.
Figure 2:
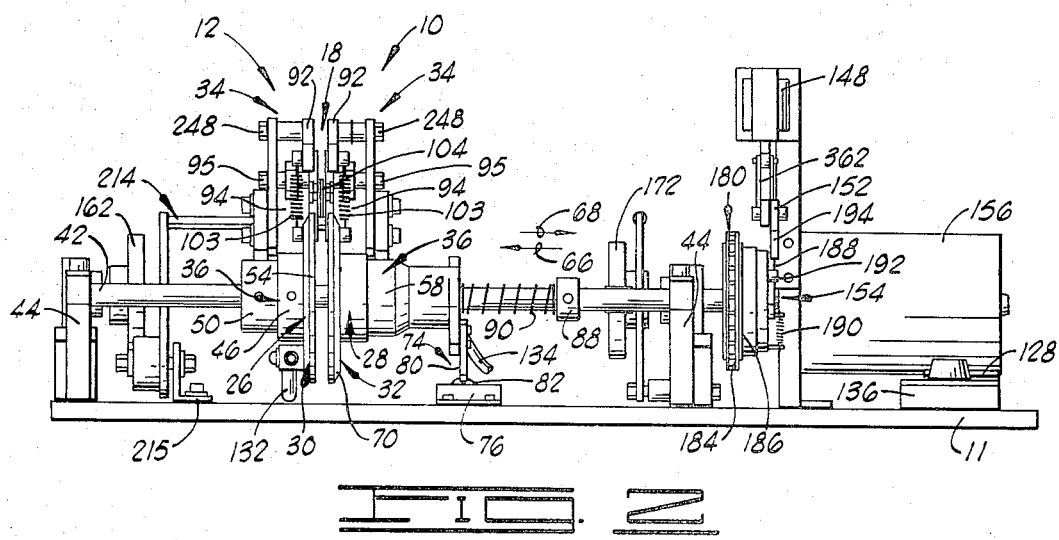
FIG. 2 is a partial, front elevational view of the welding apparatus of FIG. 1 wherein a substantial portion of the cam assembly, the welding transformer, the time delay relay, and the switch are not shown for the purpose of clarity.

Referring to the drawings in general, and to FIGS. 1 and 2 in particular, shown therein and designated by the general reference character 10 is a welding apparatus which is generally constructed to receive and automatically position parts in a predetermined welding position; apply a predetermined welding current through a portion of the parts to form a weld junction therebetween; and to automatically eject the welded or joined parts from the welding apparatus 10. The welding apparatus 10 is generally supported on a base 11, and is constructed to effect the various, required operations to efficiently and effectively form the weld junction between the parts to be joined during the operational cycle of the welding apparatus 10, the operational cycle being automatically initiated when the parts are positioned in a predetermined start position within a portion of the welding apparatus 10, in a manner which will be described in greater detail below.

Although the welding apparatus 10 is, more particularly, described below as being constructed to effect a weld junction between two electrically conductive leads, it should be particularly noted and understood that the apparatus can be utilized to effect a fusion type weld junction between various electrically conductive parts. Further, in this regard, it should be noted that the welding apparatus 10 is particularly constructed to effect a weld junction between a first conductor which is connected to a resistor and a second conductor which is connected to a glow lamp in such a manner that the resistor and the glow lamp are spaced apart a predetermined distance and, more particularly, such that the end portions of the conductors to be joined are disposed in a predetermined, automatically controlled welding position to substantially assure a consistent quality weld junction substantially free of operator error, as will be made more apparent below.

The welding apparatus 10, as shown in FIGS. 1 and 2, basically includes: a jaw assembly 12 for receiving one end portion of a first part or conductor and one end portion of a second part or conductor (the first and the second conductors being diagrammatically shown in dashed-lines in FIGS. 9, 10, 11 and 12, and designated therein by the reference numerals 14 and 16, respectively, for the purpose of clarity of description); a tongue assembly 18 for sensing the position of the conductors 14 and 16 and initiating the operational cycle of the welding apparatus 10 when the conductors 14 and 16 are in a predetermined position within the jaw assembly 12; a positioning assembly 20 for positioning the jaw assembly 12 in a predetermined position or, more particularly, for positioning the conductors 14 and 16 which are securely held within a portion of the jaw assembly 12 in a predetermined welding position, prior to the initiation of the welding cycle and subsequent to the jaw assembly 12 being positioned in an actuated holding position thereof; and a control assembly 22 for supplying operating power to the various components and assemblies of the welding apparatus 10, and for supplying the proper, predetermined welding current through the end portions of the conductors 14 and 16 to effect the required weld junction therebetween. It should be noted that the tongue assembly 18 is also constructed to eject the joined or welded conductors 14 and 16 from the jaw assembly 12 after the completion of the welding cycle and after a predetermined cooling cycle, in a manner which will be described in greater detail below.

The jaw assembly 12 is supported on the base 11, and generally includes: a first jaw assembly 26 and a second jaw assembly 28. The first jaw assembly 26 includes a first jaw support 30, and the second jaw assembly 28 includes a second jaw support 32, the first jaw support 30 and the second jaw support 32 each, more particularly, comprising an upper jaw support 34 and a lower jaw support 36.

The first jaw assembly 26 and the second jaw assembly 28 also each include an upper jaw 38 and a lower jaw 40, the upper jaws 38 and the lower jaws 40 being supported via the first jaw support 30 and the second jaw support 32 and each being constructed of an electrically conductive material such as a copper alloy, for example, so that welding current can be supplied therethrough and through the conductors 14 and 16 held between the upper jaws 38 and the lower jaws 40 during the welding cycle of the welding apparatus 10. The upper jaw 38 and the lower jaw 40 of the first jaw assembly 26 and the upper jaw 38 and the lower jaw 40 of the second jaw assembly 28 are each aligned in an assembled position, the lower end of each upper jaw 38 being disposed generally near and aligned with the upper end of one of the lower jaws 40, as shown more clearly in FIGS. 3, 4, 6, 9, 10 and 11. The lowermost end of each upper jaw 38 and the uppermost end of each lower jaw 40 are each shaped such that each upper jaw 38 cooperates with the lower jaw 40 aligned therewith for receiving and grippingly engaging and holding one end portion of the conductors 14 and 16 to be welded during the operation of the welding apparatus 10, in a manner and for reasons which will be described in greater detail below.

The uppermost end of the upper jaw 38 of the first jaw assembly 26, generally opposite the end thereof disposed near the lower jaw 40, is secured to a portion of the upper jaw support 34 of the first jaw support 30, and the uppermost end of the upper jaw 38 of the second jaw assembly 28, generally opposite the end thereof disposed near the lower jaw 40, is secured to a portion of the upper jaw support 34 of the second jaw support 32. The lowermost end of one of the lower jaws 40 is secured to a portion of the lower jaw support 36 of the first jaw support 30, and the lowermost end portion of the other lower jaw 40 is secured to a portion of the lower jaw support 36 of the second jaw support 32.

The lower jaw supports 36 are each supported on a support shaft 42 which is cylindrically shaped, in one form, and extends a distance across a portion of the base 11, as shown more clearly in FIGS. 1 and 2. Each end of the support shaft 42 is secured in a shaft support 44 and supported thereby a distance vertically above the upper surface of the base 11. The shaft supports 44 are each constructed to secure the shaft 42 therein in a non-rotating position, for reasons which will be made more apparent below.

Figure 4:
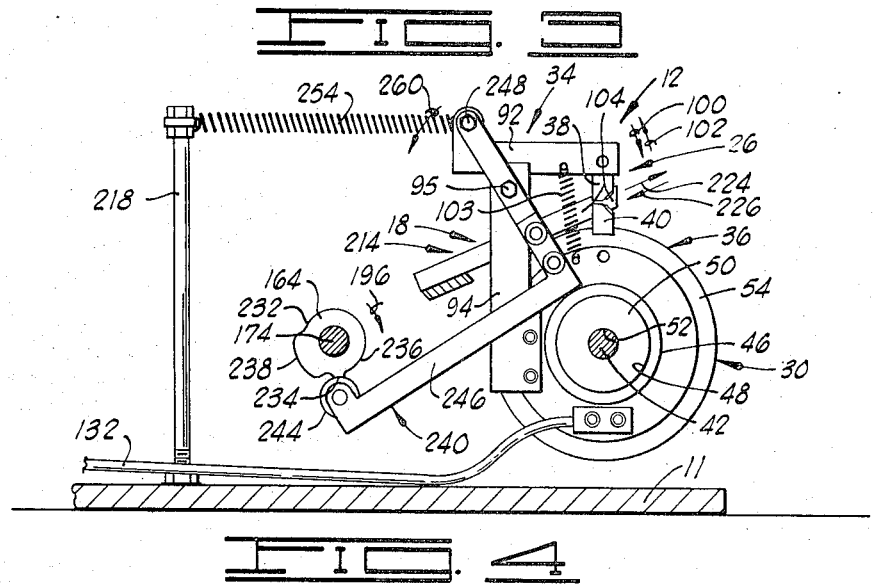
FIG. 4 is an enlarged, sectional view of the welding apparatus of FIG. 1, taken substantially along the lines 4—4 of FIG. 1.

The lower jaw support 36 of the first jaw assembly 30 includes a base 46 having opposite ends and a bore 48 extending therethrough, intersecting the opposite ends thereof, as shown more clearly in FIG. 4. The diameter of the bore 48 is larger than the diameter of the support shaft 42, and a cylindrically shaped insulator insert 50 is secured generally within the bore 48 of the base 46. The insulator insert 50 has a bore 52 extending therethrough, the support shaft 42 extending through the bore 52 of the insulator insert 50. The insulator insert 50 is constructed of an electrically insulative material, and thus provides an electrical insulation between the support shaft 44 and the first jaw assembly 26, the first jaw assembly 26 providing an electrical ground in the control assembly 22, for reasons which will become more apparent below.

A disc-shaped member 54 is formed on one end of the base 46 of the first jaw assembly 26, the member 54 extending a distance radially from the outer periphery of the base 46, as shown more clearly in FIGS. 1, 2, 3, 4 and 6, forming an end face 56. The lower jaw 40 of the first jaw assembly 26 is, more particularly, secured to the end face 56 of the base 48. The base 46 is rotatingly oriented on the support shaft 42 such that the lower jaw 40 of the first jaw assembly 26 extends generally vertically upwardly with respect to the base 11, and the base 46 is secured in this position to the support shaft 42 via a set screw. It should also be noted that the insulator insert 50 is secured in an assembled position to the support shaft 42 via a set screw, the lower jaw support 36 of the first jaw support 30 being thus secured in an assembled position to the support shaft 42 in a non-rotating, fixed position, for reasons which will be made more apparent below.

Figure 3:
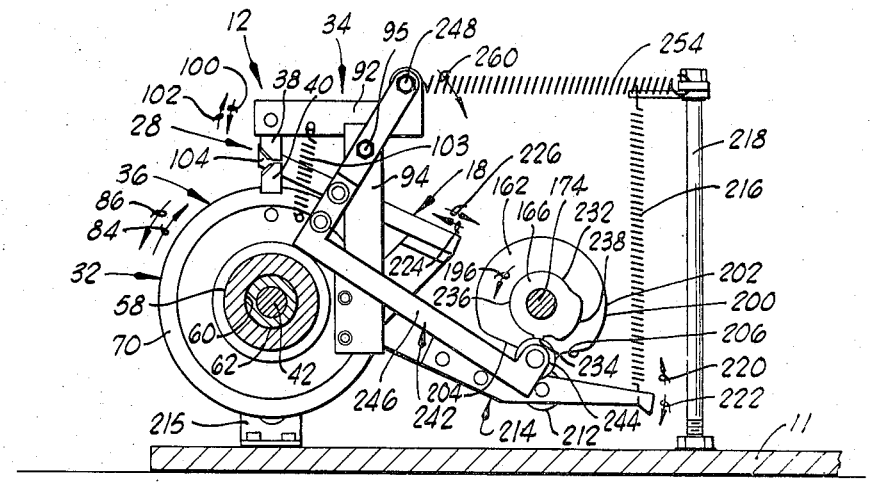
FIG. 3 is an enlarged sectional view of the welding apparatus of FIG. 1, taken substantially along the lines 3—3 of FIG. 1.

The lower jaw support 36 of the second jaw support 32 includes a base 58 having opposite ends and a bore 60 extending therethrough, intersecting the opposite ends thereof, as shown more clearly in FIG. 3. A sleeve bearing member 62 is disposed through the bore 60 through the base 58, the bearing member 62 being disposed about and in bearing and sliding engagement with the support shaft 42 such that the second jaw assembly 28 is slidably supported on the support shaft 42 to be moved in a direction 66, generally toward the first jaw assembly 26, and in a direction 68, generally away from the first jaw assembly 26, thereby decreasing and increasing the gap between the first jaw assembly 26 and the second jaw assembly 28, for reasons which will be made more apparent below.

A disc-shaped member 70, similar to the disc-shaped member 54, described before, is formed on one end of the base 58, the member 70 extending a distance radially from the outer periphery of the base 58 and forming an end face 72. The lower jaw 40 of the second jaw assembly 28 is, more particularly, secured to the end face 72 of the base 58. In an assembled position of the second jaw assembly 28, the base 58 is rotationally oriented on the support shaft 42 such that the lower jaw 40 extends generally vertically upwardly with respect to the base 11, the lower jaw support 36 being secured in this upwardly extending position via a support assembly 72, as shown more clearly in FIGS. 2 and 6.

The support assembly 72 includes a post 76 which is secured to the base 11 and, as shown in FIGS. 2 and 6, the post 76 has a portion which extends vertically upwardly from the base 11 forming a vertically extending engagement surface 78. One end portion of a rod 80 is secured to an end portion of the base 58 of the second jaw support 32, the rod 80 extending generally radially from the base 58 and having a roller type bearing member 82 rollingly secured thereto. The rod 80 is, more particularly, positioned and sized such that the bearing member 82 engages the engagement surface 78 of the support assembly 74 to rotationally position the second jaw support 32 on the support shaft 42, thereby preventing rotational movement of the second jaw assembly 28 in a rotational direction 84, as indicated in FIG. 6. The rotational movement of the second jaw assembly 28 in a rotational direction 86 is generally prevented via an engagement between a jaw cam follower and jaw cam, in a manner which will be described in greater detail below.

The upper jaws 38 and the lower jaws 40 of the first jaw assembly 26 and the second jaw assembly 28 are aligned in such a manner that the end portions of the conductors 14 and 16 inserted therethrough are properly aligned in a welding position thereof. Should the first jaw assembly 26 become misaligned with respect to the second jaw assembly 28 during the operation of the welding apparatus 10, the first jaw assembly 26 can be rotated on the support shaft 42 by disengaging the set screws to correct the misalignment in a quick and efficient manner. By the same token should the second jaw assembly 28 become misaligned with respect to the first jaw assembly 26 during the operation of the welding apparatus 10, the second jaw assembly 28 can be rotated in rotational directions 84 and 86 by moving the post 76 a distance generally toward the front of the base 11, thereby moving the engagement between the bearing member 82 and the engagement surface 78 generally toward the front of the base 11 to rotate the base 58 in a rotational direction 84, and moving the post 76 a distance generally toward the rear of the base 11, thereby moving the engagement between the bearing member 82 and the engagement surface 78 generally toward the rear of the base 11 to rotate the base 58 in a rotational direction 82. For this reason, the post 76 is, in a preferred form, secured to the base 11 through elongated slots formed therein (not shown).

A retainer 88 is secured to the support shaft 42 and spaced thereon a distance from the end of the base 58, opposite the end thereof having the member 70 formed thereon. A base bias spring 90 is disposed about a portion of the support shaft 42, one end of the base bias spring 90 engaging the retainer 88, and the opposite end of the base bias spring 90 engaging one end of the base 58 of the second jaw assembly 28. The base bias spring 90 is sized and disposed to bias the second jaw assembly 32 generally toward the first jaw assembly 26 or, more particularly, to bias the second jaw assembly 28 in a direction 66, for reasons which will be made more apparent below.

The upper jaw supports 34 of the first and the second jaw assemblies 26 and 28, each include an arm 92 having one end portion thereof pivotally secured to a support member 94 via a pivotal connection 95 therebetween. The upper jaw 38 of the first jaw assembly 26 is secured to the end of the arm 92, opposite the end thereof pivotally secured to the support member 94, and the end of the support member 94, generally opposite the end thereof pivotally connected to one end of the arm 92, is secured to a portion of the disc-shaped member 54 of the first jaw assembly 26, as shown more clearly in FIGS. 4, 9, 10 and 11. The upper jaw 38 of the second jaw assembly 28 is secured to the end of the arm 92, opposite the end thereof pivotally secured to the support member 94, and the end of the support member 94, generally opposite the end thereof pivotally connected to one end of the arm 92, is secured to a portion of the disc-shaped member 70 of the second jaw assembly 28, as shown more clearly in FIGS. 3, 6, 9, 10 and 11.

The pivotal connections between each arm 92 and the supports 94 are disposed such that the upper jaws 38 of the first jaw assembly 26 and the second jaw assembly 28 can each be pivoted in rotational directions 100 and 102 to pivot each of the upper jaws 38 generally toward the cooperating lower jaws 40 and in a direction generally away from the cooperating lower jaws 40, respectively. Each upper jaw support 34 also includes a jaw bias spring 103, one end of each jaw bias spring 103 being secured to a portion of one of the arms 92 and the opposite end of each jaw bias spring 103 being secured to a portion of one of the disc-shaped members 54 and 70. The jaw bias spring 103 of the first jaw assembly 26 thus biases the arm 92 in a rotational direction 100 generally toward the cooperating lower jaw 40, and the jaw bias spring 103 of the second jaw assembly 28 biases the arm 92 in a rotational direction 100 generally toward the cooperating lower jaw 40, the jaw bias springs 103 biasing the upper jaws 38 toward the lower jaws 40 and into engagement therewith to position the upper jaws 38 and the lower jaws 40 in a holding position wherein the parts or conductors are securedly gripped therebetween, for reasons which will be made more apparent below.

The tongue assembly 18 includes a tongue 104 which is movably supported generally between the first jaw assembly 26 and the second jaw assembly 28 and, more particularly, generally between the upper jaws 38 and the lower jaws 40 of the first jaw assembly 26 and the second jaw assembly 28, respectively. The tongue 104, as shown more clearly in FIG. 12, has a central strip 106 which is constructed of an electrically insulative material, and a conductive strip 108 and 110 is secured to the central strip 106, the conductive strip 108 being secured to one side of the central strip 106 and the conductive strip 110 being secured to the opposite side of the central strip 106.

The tongue 104 is supportedly secured within a clip 112, as shown more clearly in FIG. 12, one end portion of the tongue 104 extending through a slot 111 formed in a clip 112. The clip 112 is electrically insulated from the conductive strips 108 and 110 of the tongue 104 via a pair of insulators 114, one of the insulators 114 being interposed between the conductive strip 108 and the clip 112 and the other insulator 114 being interposed between the clip 112 and the conductive strip 110. The tongue 104 also comprises a portion of the control assembly 22 and is constructed to initiate the operation cycle of the welding apparatus 10, in a manner which will be made more apparent below.

As shown more clearly in FIG. 12, a conductor 116 is connected on one end thereof to the conductive strip 108, and a conductor 118 is connected on one end thereof to the conductive strip 110. The conductors 116 and 118 extend through a portion of the clip 112 and form a portion of a cable conductor 120. It should be particularly noted that the term "cable conductor" or, more simply, "cable" is used above and below to denote an electrical connecting assembly, which may include one or more conductors or the like, utilized to provide electrical communication between two components or assemblies.

The cable conductor 120 is connected to a time delay relay 122, as shown more clearly in FIGS. 1 and 12, the time delay relay 122 being designated in FIG. 12 by the letters "TDR". The time delay relay 122 is connected to a power source 124 via a cable conductor 126, and a power source switch 128 is interposed in the cable conductor 126 generally between the time delay relay 122 and the power source 124, the power source switch 128 being, more particularly, connected to the power source 124 via the cable conductor 129. The power source switch 128 is interposed between the power source 124 and the various electrically operated assemblies and components of the control assembly 22 of the welding apparatus 10, the power source switch 128 having an "on" position establishing communication between the power source 124 and the components and assemblies connected thereto, and an "off" position interrupting electrical communication between the power source 124 and the various electrically operated components and assemblies of the control assembly 22 connected thereto. The power switch 128 is designated in FIG. 12 by the reference letters "PSS", and the power source 124 is designated in FIG. 12 by the reference letters "PS".

The control assembly 22 also includes a welding transformer 130, designated in FIG. 12 by the reference letters "WT", the secondary winding of the welding transformer 130 being in electrical communication with the lower jaws 40 of the first jaw assembly 26 and the second jaw assembly 28 via cable conductors 132 and 134, respectively. The welding transformer 130 is constructed to supply a predetermined, relatively high current at a relatively low voltage through the lower jaws 40 and through the end portions of the parts or conductors 14 and 16 to be welded to effect the weld junction therebetween, such transformers being well known in the art and requiring no further detailed description herein.

A voltage regulator 136, designated in FIG. 12 by the reference letters "VR", is connected to the welding transformer 130 via cable conductors 138 and 140, and a switch 142 having an actuator switch arm 144 is in the cable conductor 138, generally between the voltage regulator 136 and the welding transformer 130. The voltage regulator 136 is connected to the power source switch 128 via a cable conductor 146. The voltage regulator 136 is constructed to receive electrical power from the power source 134 and to provide a predetermined, variable, controlled output power to the primary windings of the welding transformer 130, the voltage regulator 136 thereby variably controlling the welding current to be applied through the parts or conductors 14 and 16. The switch 142 has an open and a closed position, and is interposed between the power source 124 and the first and the second jaw assemblies 26 and 28 to establish electrical communication therebetween and initiate the welding cycle in a closed position thereof.

The control assembly 22 includes a clutch solenoid 148, designated in FIG. 12 by the reference letters "CS", which is connected to the time delay relay 122 via a cable conductor 150, the time delay relay 122 being, more particularly, interposed between the power source 124 and the clutch solenoid 148 and establishing electrical communication therebetween in an actuated position thereof. The clutch solenoid 148 is operably and mechanically a clutch release arm 152, designated in FIG. 12 by the reference letters "CRA". The clutch solenoid 148 is constructed to move the clutch release arm 152 to a release position in an energized position of the clutch solenoid 148 during the operation of the welding apparatus 10, for reasons which will be made more apparent below.

The clutch release arm 152 is mechanically connected to a single revolution clutch 154, designated in FIG. 12 by the reference letters "SRC". The single revolution clutch 154 is interposed between a cam drive 156 and a cam assembly 158, the cam drive 156 being designated in FIG. 12 by the reference letters "CD", and the cam assembly 158 being designated in FIG. 12 by the reference letters "CA". The cam drive 156 is connected to the power source 124 via a cable conductor 160 and, more particularly, the cam drive 156 is connected to the power source switch 128 via the cable conductor 160, the power source switch 128 being interposed generally between the power source 124 and the cam drive 156.

As shown in FIG. 1, the cam assembly 158 basically includes: a tongue cam 162, a first jaw cam 164; a second jaw cam 166; a jaw position cam 168; a switch cam 170; and a brake cam 172. Each cam is securely positioned on a cam shaft 174 and disposed thereon to cooperate with a follower and linkage to control various aspects of the operation of the welding apparatus 10 during the operation cycle thereof, in a manner which will be made more apparent below.

One end of the cam shaft 174 is bearingly and rotatingly supported within a bearing support 176, and the opposite end of the cam shaft 174 is rotatingly and bearingly supported in a bearing support 178, as shown in FIG. 1. A portion of the end of the cam shaft 174 supported in the bearing support 178 extends a distance through the bearing support 178 and is operably connected to the single revolution clutch 154. The single revolution clutch 154 is drivingly connected to the cam drive 156 via a chain-drive assembly 180 which includes a pair of drive sprockets 182 and 184, the drive sprockets 182 and 184 being drivingly interconnected via a drive chain 186. The drive sprocket 182 is secured to the output shaft of the cam drive 156 which, in a preferred form, is an electric motor or the like, and the drive sprocket 184 is operably secured and connected to the single revolution clutch 154.

The single revolution clutch 154 includes a clutch arm 188, as shown more clearly in FIG. 8, the clutch arm 188 being pivotally secured to the single revolution clutch 154. One end of a clutch bias spring 190 is connected to the clutch arm 188, and the opposite end of the clutch bias spring 190 is connected to the single revolution clutch 154, such that the clutch bias spring 190 biases the clutch arm 188 in a direction generally toward a clutch arm stop 192. The clutch arm stop 192 is positioned on the single revolution clutch 154 to engage the clutch arm 188, the single revolution clutch 154 being positioned in an engaged position thereof when the clutch arm 154 is biased into engagement with the clutch arm stop 192, during one aspect of the operation of the welding apparatus 10, as will be described in greater detail below.

A stop 194 which is secured to one end portion of the clutch release arm 152, the stop 194 being supported to engage the clutch arm 188 and move the clutch arm 188 in a direction generally away from the clutch arm stop 192 to a position wherein the single revolution clutch 154 is in the disengaged position, as shown in FIG. 8. In the disengaged position of the single revolution clutch 154, the chain-drive assembly 180 is drivingly disconnected from the cam shaft 174 and thus does not operate to rotate the cam shaft 174. The single revolution clutch 154 is constructed such that in a driven position of the chain-drive assembly 180 and in an engaged position of the single revolution clutch 154, the cam drive 156 drivingly rotates the cam shaft 174 via the chain-drive assembly 180 interconnection therebetween in a direction 196. The cam shaft 174 will thus be rotated through a single revolution (360°) and, after the cam shaft 174 has been rotated through one complete revolution, the stop 194 will engage the clutch arm 188 and position the single revolution clutch 154 in the disengaged position, thereby terminating the operation cycle of the welding apparatus 10.

Figure 5:
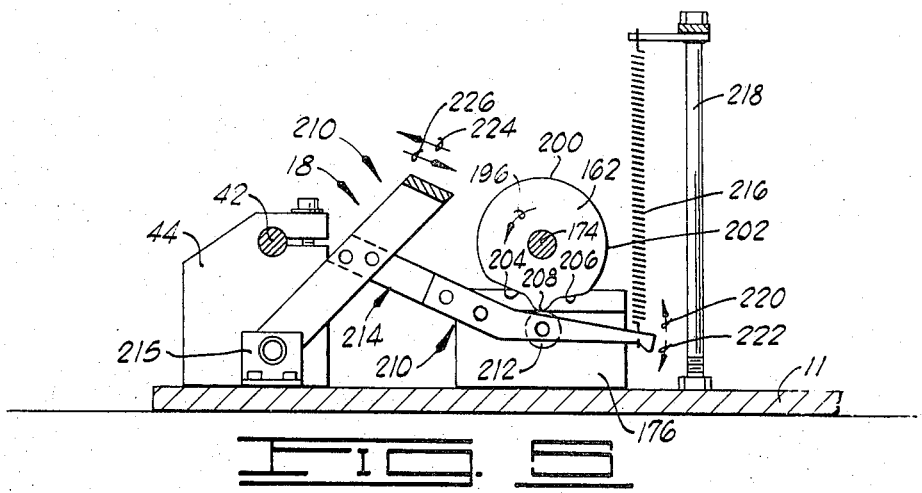
FIG. 5 is an enlarged, sectional view of the welding apparatus of FIG. 1, taken substantially along the lines 5—5 of FIG. 1.

As shown more clearly in FIG. 5, the tongue cam 162 has a cam surface 200 formed about the outer periphery thereof, the cam surface 200 having a generally circular shaped portion 202, a first arc-shaped portion 204, a second arc-shaped portion 206, and a raised portion 208 disposed generally between the first arc-shaped portion 204 and the second arc-shaped portion 206. The tongue cam 162 and, more particularly, the cam surface 200 formed thereon is shaped to cooperate with a tongue cam follower assembly 210, the tongue cam follower assembly 210 engaging the cam surface 200 of the tongue cam 162 to position the tongue 104 in predetermined positions between the first jaw assembly 26 and the second jaw assembly 28 during the operation cycle of the welding apparatus 10, in a manner which will be described in greater detail below.

As shown more clearly in FIGS. 3 and 5, the tongue cam follower assembly 210 includes a cylindrically shaped tongue follower 212 which is rollingly secured to a portion of a tongue linkage 214 and positioned thereon to engage the cam surface 200 of the tongue cam 162. The tongue linkage 214 is pivotally secured to the base 11 via a flange 215. One end of the tongue linkage 214 is secured to the clip 212, and the other end portion of the tongue linkage 214 is connected to one end of a tongue bias spring 216, the opposite end of the tongue bias spring 216 being connected to a support base 218 secured to the base 11. The cam surface 200 is constructed to cooperate with the tongue cam follower assembly 210 to move the tongue linkage 214 in a direction 220 and in a direction 222, thereby moving the tongue linkage 214 and the tongue 104 connected thereto in directions 224 and 226, respectively, to move the tongue 104 to predetermined positions between the first jaw assembly 26 and the second jaw assembly 28. The tongue bias spring 216 biases the tongue linkage 214 in a rotational direction 222, as shown in FIGS. 3 and 5, thereby biasing the outer peripherial surface of the tongue follower 212 into operational engagement with the cam surface 200 of the tongue cam 162.

Since the tongue cam 162 is rotated in a rotational direction 196 during the operation of the cam assembly 158, the tongue cam 162 will be moved such that the tongue follower 212 is initially engaging the raised portion 208 of the cam surface 200 in the start position of the tongue cam 162. As the tongue cam 162 is further rotated in the direction 196, the tongue follower 212 will be moved from the start position and subsequently engaged by the first arc-shaped portion 204, the circularly shaped portion 202, the second arc-shaped portion 206, and finally the tongue follower 212 will be engaged by the raised portion 308 and moved to the start position. In the start position of the tongue follower 212 with respect to the cam surface 200 of the tongue cam 162, the tongue 104 is in a start position and interposed generally between the upper jaws 38 and the lower jaws 40 of the first jaw assembly 26 and the second jaw assembly 28, as shown more clearly in FIGS. 3 and 9. Thus, the conductive strips 108 and 110 are interposed between the upper jaws 38 and the lower jaws 40 of the first jaw assembly 26 and the second jaw assembly 28 in the start position of the tongue assembly 18. When the tongue cam 162 is initially rotated in the rotational direction 196, the cam follower 212 will be moved from the start position and engaged by the first arc-shaped portion 204 of the tongue cam 162. The raised portion 208 and the first arc-shaped portion 204 of the cam surface 200 are each shaped such that the tongue assembly 18 is not moved during the initial, rotational movement of the tongue cam 162 for a predetermined period, in a preferred form, for reasons which will be made more apparent below.

The first arc-shaped portion 204 of the cam surface 200 is shaped to engage the tongue follower 212 to move the tongue linkage 214 in a rotational direction 220, thereby pivoting the tongue 104 in a direction 226 to withdraw the tongue 104 from between the upper jaws 38 and the lower jaws 40 of the first jaw assembly 26 and the second jaw assembly 28. The tongue linkage 214 will continue to be moved in a direction 226 as the tongue follower 212 is engaged by the first arc-shaped portion 204 of the cam surface 200, and the tongue cam 162 will continue to be rotated to a position wherein the tongue follower 212 is engaged by the circular shaped portion 202 of the cam surface 200 to withdraw the tongue 104 from the interposing position between the first jaw assembly 26 and the second jaw assembly 28, thereby positioning the tongue 104 in a weld position.

The tongue assembly 18 will remain in the "weld position" as the tongue follower 212 is engaged by the circularly shaped portion 202 until the tongue cam 162 has been rotated in the direction 196 a sufficient distance such that the tongue follower 212 is initially engaged by the second arc-shaped portion 206 of the cam surface 200. As the tongue follower 212 is engaged by the second arc-shaped portion 206, the tongue linkage 214 will be pivoted in a rotational direction 222, thereby moving the tongue 104 in a direction 224 generally between the upper jaws 38 and the lower jaws 40 of the first jaw assembly 26 and the second jaw assembly 28. The tongue 104 will continue to be moved in the direction 224 via the tongue linkage 214 to a position wherein the tongue 104 is interposed between and passes beyond the upper jaws 38 and the lower jaws 40 of the first jaw assembly 26 and the second jaw assembly 28 to engage the welded part held between the first jaw assembly 26 and the second jaw assembly 28 and eject the welded part from therebetween. After the welded part has been ejected from the welding apparatus 10, the tongue follower 212 will again be engaged by the raised portion 208, thereby moving the tongue assembly 18 to the start position.

The first jaw cam 164 and the second jaw cam 166 are each similarly constructed, the second jaw cam 166 being shown more clearly in FIG. 3 and the first jaw cam 164 being shown more clearly in FIG. 4. Each jaw cam 164 and 166 has a cam surface 232 formed about the outer periphery thereof, and each cam surface 232 includes a raised portion 234, a first circularly shaped portion 236 and a second circularly shaped portion 238, the second circularly shaped portion 238 being formed on a larger radius than the first circularly shaped portion 236, for reasons which will be made more apparent below.

A first jaw follower assembly 240 is operably connected to the first jaw cam 164 and to the upper jaw support 34 of the first jaw assembly 26 to controllingly move the upper jaw 38 thereof. A second jaw follower assembly 242 is operably connected to the second jaw cam 166 and to the upper jaw support 34 of the second jaw assembly 28 to controllingly move the upper jaw 38 thereof. The first jaw follower assembly 240 and the second jaw follower assembly 242 are each constructed similarly to simultaneously position the upper jaws 38 of the first jaw assembly 26 and the second jaw assembly 28 in corresponding or like positions during the operation cycle of the welding apparatus 10, for reasons and in a manner which will be made more apparent below.

The first jaw follower assembly 240 and the second jaw follower assembly 242 each include a generally cylindrically shaped jaw follower 244 which is rollingly connected to one end portion of a jaw linkage 246. One end portion of one of the jaw linkages 246, generally opposite the end thereof having the jaw follower 244 supported thereon, is secured to the upper jaw support 34 of the first jaw assembly 26 and, more particularly, is secured to the end of the arm 92, opposite the end of the arm 92 having the upper jaw 38 secured thereto, via a fastener 248. One end portion of the other jaw linkage 246, generally opposite the end thereof having the jaw follower 246 supported thereon, is secured to the upper jaw support 34 of the second jaw assembly 28 and, more particularly, is secured to the end of the arm 92, opposite the end of the arm 92 having the upper jaw 38 secured thereto via a fastener 248. A portion of each jaw linkage 246 is pivotally connected to one of the supports 94 via pivot shafts 95, the pivot shafts 95 also pivotally securing arm 92 to the supports 94, in a preferred form, as described before.

A jaw bias open spring 254 is secured on one end thereof to the pivot shaft 250 of the second jaw assembly 28, and the opposite end of the jaw bias open spring 254 is secured to the support 218. The jaw bias open spring 254 biases the jaw linkage 246 of the second jaw follower assembly 242 in a pivotal direction 260 and is sized to maintain a relatively small bias force on the jaw linkage 246 to facilitate the pivotal movement of the upper jaw support 34 thereof in a rotational direction 102 during the operation of the welding apparatus 10, for reasons and in a manner to be described in greater detail below.

The jaw position cam 168 has a cam surface 300 formed on one end face thereof which includes: a raised land 302, a downwardly inclined surface 304, a depressed land 306 and an upwardly inclined surface 308, as shown more clearly in FIGS. 1 and 6. The downwardly inclined surface 304 and the upwardly inclined surface 308 are each interposed between the raised land 302 and the depressed land 306, and each provide a continuous surface interconnecting the surfaces formed by the raised land 302 and the depressed land 306, for reasons which will be made more apparent below.

A jaw position follower assembly 310 operably connects the second jaw assembly 28 and the jaw position cam 168 to move the second jaw assembly 28 in directions 66 and 68 thereby positioning the second jaw assembly 28 in predetermined, controlled positions on the support shaft 42 during the operation cycle of the welding apparatus 10. The jaw position follower assembly 310 includes a generally cylindrically shaped position follower 312 rollingly connected on one end of a position linkage 314. The end of the position linkage 314, opposite the end thereof having the position follower 312 supported thereon, is secured to one end portion of the base 58 of the second jaw assembly 28. The base bias spring 90 biases the second jaw assembly 28 in the direction 66, thereby biasingly maintaining the engagement between the jaw follower 312 and the cam surface 300, in one aspect of the operation of the welding apparatus 10. It should be noted that, as the second jaw assembly 28 is being moved in the directions 66 and 68, a rolling engagement is maintained between the bearing member 82 and the engagement surface 78, the support assembly 74 thus providing a relatively free or minimum frictional resistance to the movement of the second jaw assembly 28 in the directions 66 and 68 and yet securely maintaining the rotational position of the second jaw assembly 28 on the support shaft 42.

More particularly, the cam surface 300 of the jaw position cam 168 is shaped and positioned and the jaw position follower assembly 310 is securely positioned such that when the position follower 312 is in engagement with the raised land 302 the second jaw assembly 28 is positioned in the start position on the support shaft 42 wherein a gap of a predetermined distance exists between the end faces 56 and 72 of the first and the second jaw assemblies 26 and 28, respectively, as shown more clearly in FIGS. 1, 2, 6, 9 and 10. When the jaw position cam 168 is rotated in the direction 196 to a position wherein the downwardly inclined surface 304 engages the position follower 312, the second jaw assembly 28 is moved a predetermined distance in a direction 66 generally toward the first jaw assembly 26 as the position follower 312 continues to be engaged by the downwardly inclined surface 304.

In one form, the depressed land 306 is shaped and positioned such that, when the jaw position cam 168 has been rotated in the direction 196 to a position wherein the position follower 312 is engaged by the depressed land 306, the second jaw assembly 28 has been moved a predetermined distance in the direction 66 and positioned in the weld position with respect to the first jaw assembly 26, as shown more clearly in FIG. 11. In one other embodiment, a stop (not shown) is securedly positioned on the support shaft 42 or simply on the welding apparatus 10 to engage the second jaw assembly 28 to limit the movement thereof in the direction 66 and position the second jaw assembly 28 in the weld position with respect to the first jaw assembly 26. In one embodiment, for example, the clip 112 of the tongue assembly 18 is shaped such that a portion thereof engages the end face 72 of the second jaw assembly 28 to position the second jaw assembly 28 in the weld position. In any event, when the welding apparatus 10 includes a stop or the like to engage and position the second jaw assembly 28 in the weld position, the weld position of the second jaw assembly 28 can be easily and quickly adjusted to properly position the first and the second jaw assemblies 26 and 28, respectively, in predetermined weld position for various welding applications without the necessity of repositioning the jaw position cam 168 on the cam shaft 174 or without requiring a replacement jaw position cam. In the last-mentioned embodiment of the welding apparatus 10, the position follower 312 is, in a preferred form, positioned above or spaced a distance in a general direction 68 from the depressed land 306 and thus not engaged thereby in the weld position of the first and the second jaw assemblies 26 and 28.

After the parts or conductors have been joined via a weld junction, the jaw position cam 168 is rotated to a position wherein the position follower is engaged by the upwardly inclined surface 308 of the cam surface 300. The upwardly inclined surface 308 is shaped and positioned such that, the engagement between the position follower 312 and the upwardly inclined surface 308 moves the second jaw assembly 28 in a general direction 68 toward the start position thereof. The position follower 312 is then again engaged by the raised land 302 to hold the second jaw assembly 28 in the start position as the jaw position cam 168 is further rotated in the direction 196 to a position wherein the position follower 312 is positioned on the raised land 302 in the start position thereof, as shown more clearly in FIGS. 1, 2 and 6.

The switch cam 170, shown more clearly in FIGS. 1 and 7, includes a cam surface 320 formed on the outer peripherial surface thereof, the cam surface 320 having a first arc-shaped surface 322 and a second arc-shaped surface 324. The second arc-shaped surface 324 is formed on a relatively large radius with respect to the first arc-shaped surface 322, for reasons which will be made more apparent below.

The switch cam 170 and the switch 142 are each positioned such that the second arc-shaped surface 324 engages the switch arm 144 of the switch 142 to actuatingly close the switch 148 to initiate the welding cycle of the welding apparatus 10, in one position of the switch cam 170. In the initial or start position of the switch cam 170, as shown more clearly in FIG. 6, the switch arm 144 is positioned over the first arc-shaped surface 322, the switch 148 being in a deactivated or open position, in the start position of the switch cam 170. As the switch cam 170 is rotated in the direction 196 after the initiation of the operation cycle of the welding apparatus 10, the switch cam 170 will be positioned such that the second arc-shaped surface 324 will engage the switch arm 144 to activate the switch 142, the switch 142 remaining actuated during the rotation of the switch cam 170 while the switch arm 144 remains engaged by second arc-shaped surface 324.

After the switch cam 170 has been rotated a predetermined amount, the second arc-shaped surface 324 is disengaged from the switch arm 144, thereby terminating the welding cycle of the welding apparatus 10. The switch cam 170 will be further rotated for a period of time, sometimes referred to above and below as the "cooling cycle", while the switch arm 144 remains positioned over the first arc-shaped surface 322 until the switch cam 170 and switch arm 144 are again in the start position.

As shown more clearly in FIGS. 1 and 7, the brake cam 172 includes a generally circularly shaped cam surface 330 formed about the peripherial surface of the brake cam 172, a depression 332 being formed in a portion of the cam surface 330. A generally cylindrical shaped brake follower 334 is rollingly supported on a portion of an arm 336 such that the outer peripherial surface of the brake follower 336 engages the cam surface 330 during the operating cycle of the welding apparatus 10. More particularly, the brake follower 334 is supported on a central portion of the arm 336, one end of the arm 336 being pivotally secured to a portion of the bearing support 178 and the opposite end of the arm 336 being connected to one end of a brake bias spring 338. The end of the brake bias spring 338, opposite the end thereof connected to bearing support 178, is secured to a fixed post 340, the brake bias spring 338 thus biasing the brake follower 334 into operating engagement with the cam surface 330 of the brake cam 172.

In the initial or start position of the brake cam 172, the brake follower 334 is disposed in the depression 332 and engages the portion of the cam surface 330 formed thereby to provide a relatively small frictional type resistance to rotational movement of the cam shaft 174. The frictional resistance provided by the engagement between the brake follower 334 and the depression 332 facilitates and augments the operation of the single revolution clutch 154 to stop the rotation of the cam shaft 174 after one complete revolution thereof, and maintains a controlled, predetermined frictional resistance to prevent free rotation of the cam shaft 174 during the operation cycle of the welding apparatus 10.

As shown more clearly in FIGS. 9, 10 and 11, the upper jaws 38 and the lower jaws 40 of the first jaw assembly 26 and the second jaw assembly 28 each include a guide surface 350 and a slot 352 formed therein. The slots 352 in the upper jaws 38 are aligned with and cooperate with the slots 352 in the lower jaws 38 in the holding position of the first jaw assembly 26 and the second jaw assembly 28 to form a slot shaped and sized to receive one of the conductors 14 and 16. One end of the guide surfaces 350, formed along the outer faces of the upper jaws 38 and the lower jaws 40, each intersect one of the slots 352, each guide surface 350 forming a surface in the upper jaws 38 and the lower jaws 40 to guide the conductors 14 and 16 into and through one of the receiving slots formed by the slots 352 in one of the upper jaws 38 and lower jaws 40, during the operation of the welding apparatus 10.

In one embodiment, the slots 352 in the uppwer jaw 38 and the lower jaw 40 of the first jaw assembly 26 cooperatingly combine to form a receiving slot of a particular size to receive a part or conductor of a predetermined diameter or shape, and the slots 352 in the upper jaw 38 and the lower jaw 40 of the second jaw assembly 28 cooperatingly combine to form a receiving slot of a particular size to receive a part or conductor of a predetermined diameter or shape. Where the receiving slots of the first jaw assembly 26 and the second jaw assembly 28 are of a different size or shape, the size and shape of such receiving slot assures that the particular predetermined part or conductor is inserted between and through a particular jaw assembly. Assuring that a particular part or conductor is inserted through one predetermined jaw assembly is particularly important when the tongue 104 is positioned between the upper jaws 38 and the lower jaws 40 such that one part or conductor is inserted a greater distance through the co-operating jaw assembly with respect to the other part or conductor and cooperating jaw assembly associated therewith.

It should also be noted that an automatic part feeding station can be disposed generally near the first jaw assembly 26 and generally near the second jaw assembly 28, or, in one other form, near only one of the jaw assemblies. In this embodiment of the invention (not shown in the drawings), the jaw assemblies having an automatic part feeding station are operably connected to the part feeding station to receive the part therefrom, the part being positioned between the upper jaw and the lower jaw, in a manner similar to that described before. The automatic feed stations are generally constructed to store a number of the parts and to automatically feed one of the parts to the jaw assembly to initiate the operation cycle of the welding apparatus, thereby providing a continuous part feeding type of welding apparatus.

As shown more clearly in FIGS. 1, 2 and 8, when the clutch solenoid 148 is energized, a portion of the clutch solenoid 148 moves the clutch release arm 152 in a release direction 360 via the interconnecting linkage 362 therebetween, thereby discharging the stop 194 from the clutch arm 188 to engage the single revolution clutch assembly 154. The time delay relay 122 is constructed to maintain the clutch solenoid 148 energized for a sufficient period of time to assure that the stop 94 has been disengaged from the clutch arm 188 and to then disconnect the clutch solenoid 148 from the power source 124, thereby de-energizing the clutch solenoid 148. In the de-energized position of the clutch solenoid 148, the clutch release arm 152 is lowered or released in a direction, generally opposite the direction 360, and positioned to engage the clutch arm 188 to prior to the cam shaft 174 being rotated through one complete revolution to complete the operation cycle of the welding apparatus 10.

It should be noted that the term "overlapping" is used above and below to describe a predetermined engagement position between the parts to be welded, and, as shown in FIG. 11, the parts can be positioned in an end-to-end abutting relationship, in one form. Since the welding apparatus 10 is constructed to particularly effect a fusion type weld, the parts to be welded must be engaged to some degree determined by the particular welding application.

OPERATION OF THE PREFERRED EMBODIMENT

The welding apparatus 10, described in detail before, is particularly constructed to effect a weld junction between two parts or conductors in such a manner that: the operation cycle of the welding apparatus 10 is automatically initiated, the parts or conductors to be welded are automatically positioned in a predetermined weld position; a fusion type weld junction is effected between the parts or conductors during the welding cycle of the welding apparatus 10; the parts or conductors are held in the welding position for a period of time to allow the weld junction to cool during the cooling cycle of the welding apparatus; the parts or conductors are then automatically ejected from the welding apparatus 10; and the welding apparatus 10 is then automatically returned to the start position for receiving subsequent parts or conductors to be joined by a weld junction. As mentioned before, although the welding apparatus 10 can be modified and most certainly some of the aspects of the present invention can be incorporated in other types of apparatus, the detailed description above and the following description of the operation of the welding apparatus 10 is, more particularly, described with respect to effecting a weld junction between the ends of two conductive leads, as shown in dashed-lines in FIGS. 9, 10 and 11. The conductive leads 14 and 16 shown in the drawings are, more particularly, connected to a particular electrical component to illustrate one operational embodiment of the welding apparatus 10. For example, the welding apparatus 10 can be utilized to effect a weld junction between one lead 14 which is connected on the opposite end thereof to a resistor, and a conductor 16 which is connected on one end to a glow type lamp.

In the "off" position of the power source switch 128, the various electrically operated components and assemblies are disconnected from the power source 124, and the welding apparatus 10 is thus in a non-operative status. When the power switch 128 is moved to the "on" position, thereby establishing electrical communication between the power source 124 and the various electrically operated components and assemblies of the welding apparatus 10, the welding apparatus 10 is then positioned in what may be referred to as an activated status. In this position, the power source 124 is connected to the cam drive 152, thereby actuating the cam drive 152 to drivingly rotate the drive sprockets 182 and 184 via the chain-drive assembly 180. However, since the cam arm 188 is engaged by the stop 194 of the cam release arm 152 and held thereby in an upright position against the biasing force of the clutch bias spring 190, the single revolution clutch 152 is in the disengaged position, thereby disconnecting the cam shaft 174 from the cam drive 152.

In the start position of the welding apparatus 10, the tongue cam 162, the first jaw cam 164, the second jaw cam 166, the jaw position cam 168, the switch cam 170 and the brake cam 172 are each positioned in the start position, thereby positioning each of the cooperating follower assemblies in the start position, as shown more clearly in FIGS. 5, 4, 3, 6 and 7, respectively, and as described in detail before. In the start position, the upper jaw supports 34 are, more particularly, held or maintained in the start position by the engagement of the first jaw cam 164 and the second jaw cam 166 with the first jaw follower assembly 240 and the second jaw follower assembly 242, the upper jaws 38 and the lower jaws 40 being maintained and held a distance above the lower jaws 40 of the first jaw assembly 26 and the second jaw assembly 28 against the biasing force of the jaw bias springs 103.

In the start position, the tongue 104 is interposed between the upper jaws 38 and the lower jaws 40 of the first jaw assembly 26 and the second jaw assembly 28 such that the conductive strip 108 is disposed generally near the upper jaw 38 and the lower jaw 40 of the first jaw assembly 26 and the conductive strip 110 is disposed generally near the upper jaw 38 and the lower jaw 40 of the second jaw assembly 28. The tongue assembly 18 is held or maintained in the start position by the engagement between the raised portion 208 of the tongue cam 162 and the tongue follower 212 and cooperating tongue linkage 214 connected thereto.

Further, in the start position, the positioning assembly 20 maintains a predetermined spacing between the end faces 72 and 56 of the second and the first jaw assemblies 28 and 26, respectively, via the engagement between the raised land 302 of the jaw position cam 168 and the jaw position follower 312 and interconnecting position linkage 314 connected thereto, the spacing between the end faces 72 and 56 in the start position of the first and the second jaw assemblies 26 and 28 and the controlled distance through which the second jaw assembly 28 is moved in the direction 66 being determinative of the weld position of the conductors 14 and 16. The switch arm 144 of the switch 142 is disposed above the first arc-shaped surface 322 of the switch arm 318, thereby maintaining the switch 142 in the open position, the start position of the switch cam 170 and the switch arm 144 being shown more clearly in FIGS. 7 and 12; and the brake follower 344 is disposed in the depression 332, as shown more clearly in FIG. 7. In the start position, the time delay relay 122 interrupts electrical communication between the power source 124 and the clutch solenoid 148, thereby maintaining the clutch solenoid 148 in a de-energized position.

The first jaw assembly 26, the second jaw assembly 28 and the tongue assembly 18 are shown in greater detail in FIG. 9 in the start positions thereof, and, in this position, the end portion of the conductor 14 to be welded to one end portion of the conductor 16 is inserted generally between and through the upper jaw 38 and the lower jaw 40 of the first jaw assembly 26. In one form, the end portion of the conductor 14 is initially disposed in the guide surface 350, moved therealong and guidingly inserted through the cooperating slots 352 formed in the upper jaws 38 and the lower jaws 40. The end portion of the conductor 14 is, more particularly, inserted through the slots 352 of the first jaw assembly 26, into the gap between the first jaw assembly 26 and the second jaw assembly 28 to a position wherein the end portion of the conductor 14 to be welded to one end portion of the conductor 16 engages the conductive surface 108 of the tongue 104, as shown in FIG. 9 and as diagrammatically shown in FIG. 12. The end portion of the second conductor 16 to be fused to one end portion of the conductor 14 is then inserted between the upper jaw 38 and the lower jaw 40 and through the cooperating slots 352 of the second jaw assembly 28, the guide surfaces 350 facilitating the insertion of the second conductor 16. The end portion of the second conductor 16 is further inserted through the slots 352 of the second jaw assembly 28, into the gap between the first jaw assembly 26 and the second jaw assembly 28 to a position wherein the end portion of the conductor 16 to be welded to one end portion of the conductor 14 engages the conductive strip 110 of the tongue 104 (the second conductor 16 is shown in FIG. 9 partially disposed in the guide surface 350 of the lower jaw 40 of the second jaw assembly 28, and diagrammatically shown in FIGS. 10 and 12 in engagement with the conductive strip 110 and the tongue 104).

When the conductors 14 and 16 engage the conductive strips 108 and 110 of the tongue 104, an electrical short is established across the conductors 116 and 118 of the cable conductor 120. The time delay relay 122 is constructed such that when an electrical short is established between the conductors 116 and 118, the time delay relay 122 establishes electrical communication between the cable conductor 126 and the cable conductor 146, thereby establishing electrical communication between the power source 124 and the clutch solenoid 148 via the time delay relay 122 and energizing the clutch solenoid 148. In a preferred form, the conductors 14 and 16 must engage the tongue 104 for a relatively small, predetermined period of time before the time delay relay 122 functions to energize the clutch solenoid 148 to assure the conductors 14 and 16 are properly positioned in the first and the second jaw assemblies 26 and 28.

In the energized position of the clutch solenoid 154, the arm 152 is moved in a release direction 360, as shown in FIG. 8, to disengage the stop 194 from the clutch arm 188 of the single revolution clutch 154, the clutch arm 188 being biased via the clutch bias spring 190 into engagement with the stop 192 to position the single revolution clutch 154 in an engaged position. In the engaged position of the single revolution clutch 154, the cam drive 156 drivingly rotates the cam shaft 174 in a direction 196 via the interconnecting chain-drive assembly 180 therebetween. The operation cycle of the welding apparatus 10 is thus initiated by the simultaneous engagement of the conductors 14 and 16 with the conductive strips 108 and 110, the welding apparatus 10 being thus constructed to assure that the conductors 14 and 16 are positioned in a predetermined, start position within the first jaw assembly 26 and the second jaw assembly 28 prior to the initiation of the operation cycle of the welding apparatus 10.

After the initiation of the operation cycle of the welding apparatus 10, the cam shaft 174 is drivingly rotated to rotate the cams of the cam assembly 158 in a direction 196 via the cam drive 156. The first and the second jaw cams 164 and 166 are rotated to a position wherein the jaw followers 244 are moved from the raised portions 234 and engaged by the first circularly shaped portions 236 to move the upper jaws 38 of the first jaw assembly 26 and the second jaw assembly 28 into engagement with the lower jaws 40, thereby positioning the first and the second jaw assemblies 26 and 28 in the hold position, grippingly engaging and securedly holding the conductors 14 and 16 in position therebetween as shown in FIG. 10. The tongue cam 162 is rotated to a position wherein the tongue follower 212 is moved from the raised portion 208 and engaged by the first arc-shaped portion 204, to move the tongue 104 in a direction 226 from the start position.

As the upper jaws 38 are each being moved to the hold position and the tongue 104 is being withdrawn from the start position, the position follower 312 continually engages the raised land 302, thereby maintaining the initial, start position of the second jaw support 32 with respect to the first jaw support 30, and the switch arm 144 of the switch 142 remains generally disposed over the first arc-shaped surface 322 of the switch cam 170, thereby maintaining the switch 142 in the open position. The brake follower 334 has been moved out of the depression 332 and engages the cam surface 330, the brake follower 334 being maintained in this status until the operation cycle of the welding apparatus 10 is terminated.

The tongue follower 212 will continue to be engaged by the first arc-shaped surface 104 and thus continue to withdraw the tongue 104 from between the first jaw assembly 26 and the second jaw assembly 28 until the tongue cam 162 has been rotated to a position wherein the tongue follower 212 engages the circularly shaped portion 202 of the tongue cam 162. When the circularly shaped portion 202 of the tongue cam 162 engages the tongue follower 212, the tongue 104 has beeen withdrawn from between the first jaw assembly 26 and the second jaw assembly 28 and the tongue 104 is positioned in a welding position.

After the tongue assembly 18 has been moved to the welding position thereof, the jaw position cam 168 has been rotated to a position wherein the position follower 312 is engaged by the downwardly inclined surface 304 of the jaw position cam 168, in one form, as described before. As the position follower 312 is engaged by and moves along the downwardly inclined surface 304 of the jaw position cam 168, the second jaw support 32 is moved in a general direction 66 generally toward the first jaw support 30, thereby moving the second conductor 16 generally toward a weld position with respect to the first conductor 14. As the position follower 312 is engaged by the downwardly inclined surface 304 of the jaw position cam 168, the switch arm 144 remains disposed generally over the first arc-shaped surface 322 of the switch cam 170, thereby maintaining the switch 142 in the open position.

After the second jaw support 32 has been moved a predetermined distance in a direction 66 toward the first jaw support 30 to a position wherein the end portion of the first conductor 14 is disposed in a predetermined engaging, welding position with respect to the end portion of the second conductor 16 to be welded thereto, the position follower 312 will be engaged by the depressed land 306 of the jaw position cam 168 to maintain the first jaw assembly 26 and the second jaw assembly 28 in the welding position for a predetermined period of time controlled by the arc of the depressed land 306. In one form, as described before, the second jaw support 32 is moved in the direction 66 toward the weld position thereof and engages a portion of the clip 112 or a stop or the like to terminate such movement and position the second jaw assembly 28 in a welding position with respect to the first jaw assembly 26, the position follower 312 being disposed generally over the depressed land 306 and the incline of the downwardly inclined surface 308 generally defining the amount of stop adjustment available for various applications without repositioning the jaw position cam 168 on the cam shaft 174.

After the conductors 14 and 16 have been secured and positioned in the weld position, as shown in FIG. 11, the switch arm 144 of the switch 142 is engaged by the second arc-shaped surface 324 of the switch cam 170, thereby moving the switch arm 144 and closing the switch 142. In the closed positions of the switch 144 electrical communication is established between the welding transformer 130 and the power source 124 via the voltage regulator 136 and the power source switch 128, as diagrammatically shown in FIG. 12, thereby positioning the control assembly 22 in the weld position wherein welding current is applied through the engaging end portions of the conductors 14 and 16 via the power source 124, the voltage regulator 136, the welding transformer 132, and the interconnecting portions of the first jaw assembly 26 and the second jaw assembly 28 and, more particularly, the upper jaws 38 and lower jaws 40 of the first jaw assembly 26 and the second jaw assembly 28, which, in a preferred form, are constructed of a conductive material. The second jaw assembly 28 provides a ground side for the welding circuit via the insulator 50, interposed between the lower jaw support 36 of the first jaw assembly 26 and the support shaft 42. The welding cycle portion of the operation cycle is thus initiated via the closing of the switch 142 by the switch cam 170.

The switch 142 is maintained in the closed position and welding current is applied through a portion of the conductors 14 and 16 for an interval of time determined by the length of the arc formed by the second arc-shaped surface 324. The switch arm 144 of the switch 142 is subsequently disengaged from the second arc-shaped surface 324 and again positioned over the first arc-shaped surface 322 of the switch cam 170 to open the switch 142 and terminate the welding cycle of the welding apparatus 10. After the termination of the welding cycle of the welding apparatus 10, the control assembly 22 maintains the welded conductors 14 and 16 in a secure stationary position for a brief interval of time, referred to as the cooling cycle of the operation cycle, to allow the weld junction therebetween sufficient time to cool thereby assuring a positive weld between the conductors 14 and 16.

At the termination of the cooling cycle of the welding apparatus 10, the jaw followers 244 of the first and the second jaw follower assemblies 240 and 242 are each engaged by the portions of the cam surfaces 232 between the second circularly shaped portion 238 and the raised portion 234 to move the upper jaws 38 of the first and the second jaw assemblies 26 and 28 in a direction 102 to an eject position releasing the gripping hold on the conductors 14 and 16. After the upper jaws 38 have been positioned in the eject position, the tongue follower 312 is engaged by the second arc-shaped portion 206 of the tongue cam 162 to move the tongue 104 in a direction 224 via the tongue cam follower assembly 210. More particularly, the tongue 104 is moved between and through the first jaw assembly 26 and the second jaw assembly 28, generally past the start position of the tongue assembly 18, and into engagement with the joined conductors 14 and 16, the tongue 104 being further moved in the direction 224 to the eject position wherein the tongue 104 ejects the joined conductors 14 and 16 in a general direction 224 from between the upper jaws 38 and the lower jaws 40 of the first jaw assembly 26 and the second jaw assembly 28.

After the tongue 104 has been moved through the eject position and the joined conductors 14 and 16 have been ejected from the welding apparatus 10, the tongue cam 162 will be moved to a position wherein the tongue follower 212 is again engaged by the raised portion 208 to reposition the tongue assembly 18 in the start position, and the jaw followers 244 are each engaged by the respective raised portions 234 of the first and the second jaw cams 164 and 166 to again position the first and the second jaw assemblies in the start position. Further, after the termination of the cooling cycle and after the welded conductors 14 and 16 have been ejected from the welding apparatus 10, the position follower 312 is engaged by the upwardly inclined surface 308 of the position cam 168 to move the second jaw assembly 28 in a direction 68 generally toward the start position thereof, the second jaw assembly 28 being positioned in the start position when the position follower 312 is again engaged by the raised land 302 of the position cam 168. The position cam 168 is further rotated as the position follower 312 engages the raised land 302 to a position wherein the positioning assembly 20 is again positioned in the start position thereof.

Finally, the clutch arm 188 is again engaged by the stop 194 portion of the clutch release arm 152 and moved thereby to the engaged position or start position, as shown in FIG. 8, to engage the single revolution clutch 154. The brake follower 334 is biased into the depression 332 of the brake cam 172 to add a frictional resistance to the rotation of the cam shaft 174 and augment the so-called braking action of the single revolution clutch 154, thereby terminating the operation cycle of the welding apparatus 10.

The welding apparatus 10, described in detail above, is thus constructed to assure that the conductors to be welded are properly positioned between the jaws of the first and the second jaw assemblies prior to the initiation of the operation cycle thereof. More particularly, the proper positioning of the conductors in the first and the second jaw assemblies automatically initiates the operation cycle or starts the welding apparatus. After the initiation of the operation cycle, the first and the second jaw assemblies are automatically positioned to securedly hold the conductors in the start position, and the first and the second jaw assemblies are then automatically positioned in the weld position, the welding cycle and subsequent cooling cycle being then automatically initiated. The welded conductors are automatically ejected from the welding apparatus and the welding apparatus is then automatically repositioned in the start position. The entire operating cycle, is completed within a relatively short period of time, 1 or 2 seconds in most applications, and in a manner which substantially reduces the opportunity for operator error since the parts or conductors are held and positioned in a controlled manner by the welding apparatus during the entire operation cycle thereof. The automatic start or initiation of the welding apparatus 10 via the tongue 104 and cooperating portions of the control assembly 22 can be easily adapted to function with other embodiments and forms of welding apparatus, and with other apparatus in general for that matter, as mentioned before.

Changes may be made in the construction and the arrangement of the parts or the elements of the various embodiments as disclosed herein without departing from the spirit and the scope of the invention as defined in the following claims.

What is claimed is:

1. A welding apparatus for effecting a weld junction between two parts during the operation cycle thereof, the welding apparatus comprising:
   a base;
   means supported on the base having a portion movable to one position receiving the parts and to a holding position grippingly engaging the received parts, and a portion movably positioning the parts held therein in a predetermined weld position in one other position thereof;

means having a portion disposed near the first-mentioned means sensingly engageable with a portion of each of the parts received in the first-mentioned means in a predeter-mined, sensed start position of the received parts;

means connected to the first-mentioned means applying welding current through the parts effecting the weld junction therebetween in one position thereof;

means connected to the first-mentioned means positioning the first-mentioned means to receive the parts in one position, in the holding position in one other position, and to position the parts in the weld position in one other position; and means having one portion connected to the means sensingly engageable with the parts, another portion connected to the means positioning the first-mentioned means, and one other portion connected to the means applying the welding current through the parts, said means initiating the operation cycle and positioning the first-mentioned means in the holding position in the predetermined start position of the received parts sensed via the means sensingly engageable with the parts, positioning the first-mentioned means in the position moving the parts held therein to the predetermined weld position subsequent to the first-mentioned means being positioned in the holding position, and positioning the means for applying welding current through the parts in the position applying welding current through the parts to effect a weld junction between the parts subsequent to the parts being positioned in the weld position via the first-mentioned means, said means cooperating with the means positioning the first-mentioned means, the means sensingly engageable with the parts and the means applying the welding current for auto-matically grippingly engaging the parts in the start position of the parts, automatically moving the parts to the start position subsequent to the parts being grippingly engaged, and automatically applying welding current through the parts effecting the weld junction therebetween after the positioning of the parts in the weld position.

2. The welding apparatus of claim 1 wherein the last-mentioned means is defined further to include:

positioning means connected to a portion of the first-mentioned means movably positioning the parts in the weld position subsequent to the first-mentioned means being positioned in the holding position.

3. The welding apparatus of claim 2 wherein the first-mentioned means receiving the parts is defined further to include:

a support shaft supported on the base;

first jaw means connected to the support shaft and having a portion receiving one of the parts; and second jaw means movably supported on the support shaft and having a portion receiving one of the parts to be welded to the part received in the first jaw means; and wherein the positioning means is defined further to include:

a position linkage connected on one end thereof to a portion of the second jaw means and having a position follower connected on the opposite end thereof; and means engaging the position follower of the position linkage to move the second jaw means generally toward the first jaw means to position the parts in a weld position, and to move the second jaw means generally away from the first jaw means to position the second jaw means in a start position spaced a predetermined distance from the first jaw means forming a gap therebetween.

4. The welding apparatus of claim 3 wherein the first jaw means and the second jaw means are each defined further to include:

a lower jaw support disposed on the support shaft;

a lower jaw secured to the lower jaw support;

an upper jaw support movably secured to a portion of the lower jaw support;

an upper jaw secured to the upper jaw support generally aligned with the lower jaw;

and wherein the means positioning the first-mentioned means in the holding position is defined further to include:

jaw linkage means pivotally supported on a portion of each upper jaw support and each jaw linkage means having a jaw follower connected to one end portion thereof, the opposite end portion secured to a portion of the upper jaw supports; and means engaging each jaw follower of each jaw linkage means pivotally moving each jaw linkage to move the upper jaw support connected thereto to a position supporting each upper jaw a distance generally above one of the lower jaws in a start position and moving each jaw linkage to move each upper jaw support to a positioning engaging one of the lower jaws, each of the engaging upper jaws and lower jaws securely gripping one of the parts therebetween in a holding position.

5. The welding apparatus of claim 4 wherein each upper jaw support is defined further to include: a jaw bias spring having one end connected to a portion of one of the upper jaw supports and the opposite end thereof connected to one of the lower jaw supports, the jaw bias spring biasing each of the upper jaw supports generally toward the holding position thereof.

6. The welding apparatus of claim 4 wherein the portion of the means sensing the position of the parts in the first-mentioned means is defined further to include:

tongue means movably supported on the base and having a portion interposed in a portion of the first-mentioned means in the start position thereof, a portion of the tongue means engaging a portion of one of the parts received in the first-mentioned means in a predetermined start position of that part, and another portion engaging a portion of the other part received in the first-mentioned means in a predetermined start position of the other part; and wherein the means automatically initiating the operation cycle of the welding apparatus is defined further to include:

control means connected to portions of the tongue means engaging the parts initiating the operation cycle of the welding apparatus in an engaged position of each of the parts with the tongue means.

7. The welding apparatus of claim 6 wherein the tongue means is defined further to include:

a tongue having a portion engaging a portion of one of the parts received in the first-mentioned means in a predetermined, start position of that part, and another portion engaging a portion of the other part received in the first-mentioned means in a predetermined, start position of the other part, the tongue interposed generally between the first jaw means and the second jaw means in a start position thereof;

tongue linkage means pivotally supported on the base having a tongue follower connected to one end portion thereof, the opposite end portion of the tongue linkage connected to a portion of the tongue; and means engaging the tongue follower to position the tongue in the start position, and to withdraw the tongue from between the first and the second jaw means to a weld position during the welding cycle of the operation cycle of the welding apparatus.

8. The welding apparatus of claim 7 wherein the means engaging the position follower is further defined to include: a position cam having a cam surface formed thereon, the cam surface engaging the position follower; and wherein the means engaging the jaw followers is further defined to include: a first jaw cam having a cam surface formed thereon, the cam surface engaging the jaw follower of the jaw linkage secured to a portion of the upper jaw support of the first jaw means; and a second jaw cam having a cam surface formed thereon, the cam surface engaging the jaw follower on the jaw linkage secured to a portion of the upper jaw support on the second jaw means; and wherein the means engaging the tongue follower is defined further to include: a tongue cam having a cam surface formed thereon, the cam surface engaging the tongue follower; and wherein the welding apparatus includes: a cam shaft bearingly and rotatingly supported on the base, the position cam, the first jaw cam, the second jaw cam and the tongue cam each being rotatingly supported and positioned on a portion of the cam shaft; and cam drive means connected to the cam shaft in one position to drivingly rotate the cam shaft during the operation cycle of the welding apparatus.

9. The welding apparatus of claim 8 defined further to include:

clutch means connected to the cam shaft and interposed generally between the cam drive means and the cam shaft, the clutch means having an engaged and a disengaged position, the drive cam means being drivingly connected to the cam shaft in an engaged position of the clutch means;

means positioning the clutch means in an engaged position in one position thereof, and positioning the clutch means in a disengaged position in one other position thereof;

clutch solenoid means operably connected to the means positioning the clutch means in an engaged and disengaged position to position the clutch means in an engaged position in an energized position of the clutch solenoid means; and means to energize the clutch solenoid means to initiate the operation cycle of the welding apparatus.

10. The welding apparatus of claim 9 wherein the means positioning the clutch arm in an engaged and a disengaged position includes:

a clutch arm pivotally and operably connected to the clutch means in the engaged position in the one position thereof and in the disengaged position in one other position thereof;

a clutch bias spring connected to the clutch arm biasing the clutch arm to position the clutch means in an engaged position; and a clutch release arm connected to the clutch solenoid means and having a portion engaging the clutch arm moving the clutch arm to position the clutch means in a disengaged position in one position of the clutch release arm, the clutch release arm being moved in a release direction to position the clutch means in an engaged position in an energized position of the clutch solenoid means.

11. The welding apparatus of claim 9 wherein the means energizing the clutch solenoid means includes:

power source means connected to the clutch solenoid means energizing the clutch solenoid means when in electrical communication therewith; and means interposed between the power source means and the clutch solenoid means establishing electrical communication therebetween in an actuated position thereof, a portion of said means connected to the portion of the tongue engaging one of the parts and one other portion of said means connected to the portion of the tongue engaging the other part, said means being actuated in an engaging position of the two parts and the respective portions of the tongue.

12. The welding apparatus of claim 11 wherein the means interposed between the power source means and the clutch solenoid means is defined further as a time delay relay means constructed such that the parts engage the respective portions of the tongue for a predetermined period of time to actuate the time delay relay means, thereby assuring the parts are positioned in the start position prior to initiating the operating cycle of the welding apparatus.

13. The welding apparatus of claim 11 wherein the means applying the welding current through the parts includes:

welding transformer means having secondary windings connected to a portion of the first and the second jaw means, and primary windings connected to the power source means; and voltage regulator means interposed between the welding transformer means and the power source means for controllingly varying the welding current during one aspect of the operation of the welding apparatus.

14. The welding apparatus of claim 13 defined further to include:

switch means interposed between the power source means and the first and the second jaw means having an open and a closed position establishing electrical communication therebetween in a closed position thereof, the welding cycle of the operation cycle being initiated in a closed position of the switch means; and means having a portion connected to the switch means to open and close the switch means, said means closing the switch means in a weld position of the parts and opening the switch means in the start positon of the welding apparatus, the opening of the switch means terminating the welding cycle of welding apparatus.

15. The welding apparatus of claim 14 wherein the switch means includes a switch arm opening the switch means in one position thereof and closing the switch means in one position thereof; and wherein the means opening and closing the switch means includes:

a switch cam having a cam surface formed thereon, including a first arc-shaped surface and a second arc-shaped surface, the switch cam secured to a portion of the cam shaft, and the second arc-shaped surface engaging the switch arm to close the switch means in one position of the switch cam to initiate the welding cycle and the second arc-shaped surface shaped to maintain the switch means closed during the welding cycle.

16. The welding apparatus of claim 15 wherein the cam surface of the position cam is shaped and disposed to engage the position follower to maintain the second jaw means in the weld position with respect to the first jaw means for a period of time subsequent to the termination of the welding cycle during a cooling cycle, thereby allowing the weld junction therebetween to cool as the parts are secured in a weld position.

17. The welding apparatus of claim 16 wherein a portion of each of the cam surfaces of the first and the second jaw cams is shaped to engage the jaw followers to move the first and the second jaw means to eject position subsequent to the termination of the cooling cycle, each upper jaw positioned a distance above the lower jaws in the eject position thereof, and wherein a portion of the cam surface of the tongue cam is shaped and disposed to engage the tongue follower to move the tongue between the first and the second jaw means engaging the welded parts and ejecting the welding parts from the welding apparatus, and another portion of the cam surface of the tongue cam shaped and then positioned to engage the tongue follower to move the tongue to the start position subsequent to the welding parts being ejected from the welding apparatus; and wherein a portion of the position cam is shaped and disposed to engage the position follower to move the second jaw means to the start position subsequent to the welding parts being ejected from the welding apparatus.

18. The welding apparatus of claim 17 defined further to include:

a brake cam connected to the cam shaft having a cam surface formed thereon, a depression being formed on a portion of the cam surface;

an arm pivotally supported on a portion of the base;

a brake follower connected to a portion of the arm, the brake follower engaging the cam surface of the brake cam during the operation cycle and engaging the portion of the cam surface formed by the depression therein in the start position and at the termination of the operation cycle; and a brake bias spring having a portion connected to the arm biasing the arm to bias the brake follower into engagement with the cam surface of the brake arm.

19. The welding apparatus of claim 7 wherein the tongue includes:

a central strip constructed of an electrical insulative material;

a conductive strip secured to one side of the central strip, engaging a portion of one of the parts in the start position of that part; and a conductive strip secured to the opposite side of the central strip with respect to the side having the first-mentioned conductive strip secured thereto, the last-mentioned conductive strip engaging the other part in a start position of that part.

20. The welding apparatus of claim 4 wherein each lower jaw includes: a slot formed therein receiving one of the parts, and a guide surface formed therein having one end portion intersecting the slot, each guide surface guiding one of the parts to one of the slots for insertion therethrough.

21. The welding apparatus of claim 20 wherein each upper jaw includes: a slot formed therein each of the slots in the upper jaws combining and cooperating with the slots formed in one of the lower jaws for receiving one of the parts, and a guide surface formed therein having one end portion intersecting the slot in the upper jaws, each guide surface guiding one of the parts to one of the slots for insertion therethrough.

22. The welding apparatus of claim 3 wherein the positioning means is defined further to include:

a post secured to the base having a portion forming an engagement surface;

bearing member means securedly connected to a portion of the second jaw means and rollingly engaging the engagement surface to facilitate the positioning movement of the positioning means and to maintain the rotational position of the second jaw means on the support shaft in one direction; and means connected to the second jaw means maintaining the rotational position thereof in a direction generally opposite the rotational direction maintained via the engagement between the bearing means and the engagement surface.

23. The welding apparatus of claim 22 wherein the positioning means is defined further to include:

retainer means secured to the support shaft spaced from the second jaw means; and base bias spring engaging the retainer means and the second jaw means to bias the second jaw means in a direction generally toward the weld position, and maintaining engagement between the position follower and the means engaging the position follower.

* * * * *

PO-1050
(5/69)

UNITED STATES PATENT OFFICE
CERTIFICATE OF CORRECTION

Patent No. 3,778,584           Dated   December 11, 1973

Inventor(s)  John Fait and James V. Neal, Jr.

It is certified that error appears in the above-identified patent and that said Letters Patent are hereby corrected as shown below:

Column 5, line 28, "48" should be -46-.

Column 8, line 51, "actuator" should be -actuating-.

Column 11, line 12, "308" should be -208-.

Column 16, line 38, "94" should be -194-.

Column 16, line 45, after the numeral "188" delete the word "to".

Column 26, line 62, "positon" should be -position-.

Column 27, line 30, "welding" should be -welded-.

Signed and sealed this 23rd day of April 1974.

(SEAL)
Attest:

EDWARD M.FLETCHER,JR.              C. MARSHALL DANN
Attesting Officer                  Commissioner of Patents